United Sta
Meeussen et al.

[11] 3,897,132
[45] July 29, 1975

[54] METHOD AND APPARATUS FOR CORRECTING PYRAMIDAL ERROR IN AN OPTICAL SYSTEM WITH A MIRROR WHEEL

[75] Inventors: Louis Achilles Meeussen, Mortsel, Belgium; Josef Helmberger, Munich; Klaus Staddler, Irschenhausen, both of Germany

[73] Assignee: Agfa-Gevaert AG, Leverkusen, Germany

[22] Filed: Feb. 5, 1974

[21] Appl. No.: 439,761

[30] Foreign Application Priority Data
Feb. 8, 1973 Germany............................ 2306185

[52] U.S. Cl...................................... 350/7; 350/285
[51] Int. Cl.²........................................ G02B 17/00
[58] Field of Search............ 350/6, 7, 285, 286, 287

[56] References Cited
UNITED STATES PATENTS

| | | | |
|---|---|---|---|
| 1,821,349 | 9/1931 | Leventhal | 350/6 |
| 3,705,755 | 12/1972 | Baer | 350/6 |
| 3,765,742 | 10/1973 | Walles | 350/7 |
| 3,806,222 | 4/1974 | Knappe | 350/7 |

*Primary Examiner*—Alfred E. Smith
*Assistant Examiner*—Michael J. Tokar
*Attorney, Agent, or Firm*—Michael S. Striker

[57] ABSTRACT

A method and apparatus for correcting pyramidal errors in light reflected from a mirror wheel, in which a light beam reflected by the mirror wheel is directed onto a first plane mirror which reflects the light beam onto a second plane mirror including an angle with the first and the thus twice reflected light beam passes from the second mirror back onto the mirror wheel and is finally reflected from the latter to a focussing lens.

9 Claims, 3 Drawing Figures

PATENTED JUL 29 1975 3,897,132

SHEET 1

METHOD AND APPARATUS FOR CORRECTING PYRAMIDAL ERROR IN AN OPTICAL SYSTEM WITH A MIRROR WHEEL

BACKGROUND OF THE INVENTION

The present invention relates to optical systems employing a mirror wheel, and more particularly to improvements in the method and apparatus for correcting pyramidal error resulting from reflections from the mirror wheel.

A mirror wheel is an optical device which incorporates a series of plane mirror surfaces around the circumference of a cylinder. The mirror wheel rotates on an axis which is ideally exactly parallel to the plane mirror surfaces.

Such a system may be used in a telecentric system where a slight change from exact focus will not greatly change the apparent size of the object. The system may also be used in optical measuring devices to eliminate parallax between an image and the scale for its measurement. Another application concerns the exposure of light sensitive material by a linear scanning method.

It is presently possible to obtain mirror wheels of very high quality, with a pyramidal error between 5 and 25 seconds of arc. Integrated systems employing such mirror wheels are very expensive, with a price range between $10,000 and $35,000. These expensive systems however still result in an undesirable vertical displacement of the resulting line images.

SUMMARY OF THE INVENTION

An object of the invention is to provide a novel and improved method and apparatus for correcting the pyramidal error resulting from reflections from a mirror wheel.

Another object of the invention is to provide an apparatus wherein light is reflected from a mirror wheel into a roof-shaped mirror, which then reflects the light back to the mirror wheel. A "roof-shaped mirror" is defined as at least two intersecting planar mirrors, and is to be so considered throughout the specification and claims.

A further object of the invention is to provide a novel and improved telecentric focussing system to operate in conjunction with a mirror wheel.

In the method according to the present invention light from a mirror wheel is reflected onto a roof-shaped mirror. The roof-shaped mirror reflects the light back to the mirror wheel, where it is again reflected, and this final beam is then focussed on a plane. The roof-shaped mirror comprises two plane mirrors, arranged in such a manner so that the incoming light beam is twice reflected before it is returned to the mirror wheel, and the focussing arrangement focusses the outgoing beam from the mirror wheel in a plane, thereby correcting any pyramidal error present.

The apparatus as defined by the present invention comprises a light source, a mirror wheel having an axis, reflecting means such as a pair of intersecting plane mirrors, and focussing means such as a telecentric optical system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
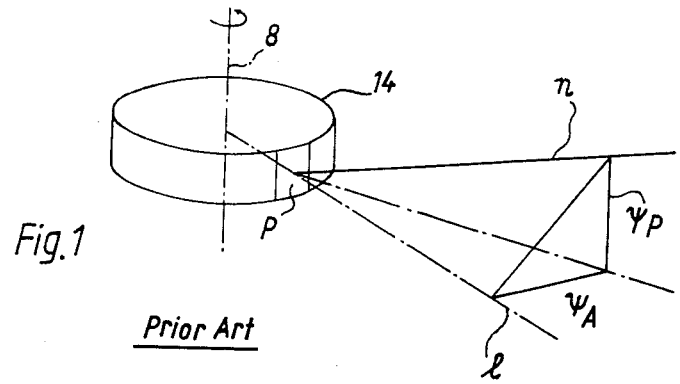
FIG. 1 illustrates a mirror wheel with the usual type of pyramidal error.

FIG. 1 shows a plane surface P of a mirror wheel 14, well known in the art, rotating around an axis 8. A radial line 1 is perpendicular to the axis 8 and intersects the plane P. A normal line n is perpendicular to the surface P. The lines 1 and n are not collinear, thereby resulting in a pyramidal error $\psi_P$ and an azimuth error $\psi_A$.

The angular errors in a good mirror wheel are smaller than an angular minute. It is particularly troublesome however, when each of the plane surfaces of the mirror wheel has a different pyramidal error.

In applying a mirror wheel, one must be aware of this total pyramidal and azimuthal error. The total range of error is the sum of the largest positive error and the largest negative error for both the pyramidal error and the azimuthal error. Because of the large number of surfaces on a mirror wheel, this range could be considerable.

The purpose of the invention is to compensate or correct this aforementioned pyramidal error $\psi_P$.

A mirror wheel of high quality and price, with 18 facets or mirror surfaces, and a diameter of 60 mm, may have a maximal pyramidal error of about 30 angular seconds, or half of an angular minute. Such high quality mirror wheels are usually constructed of tool steel.

Figure 2:
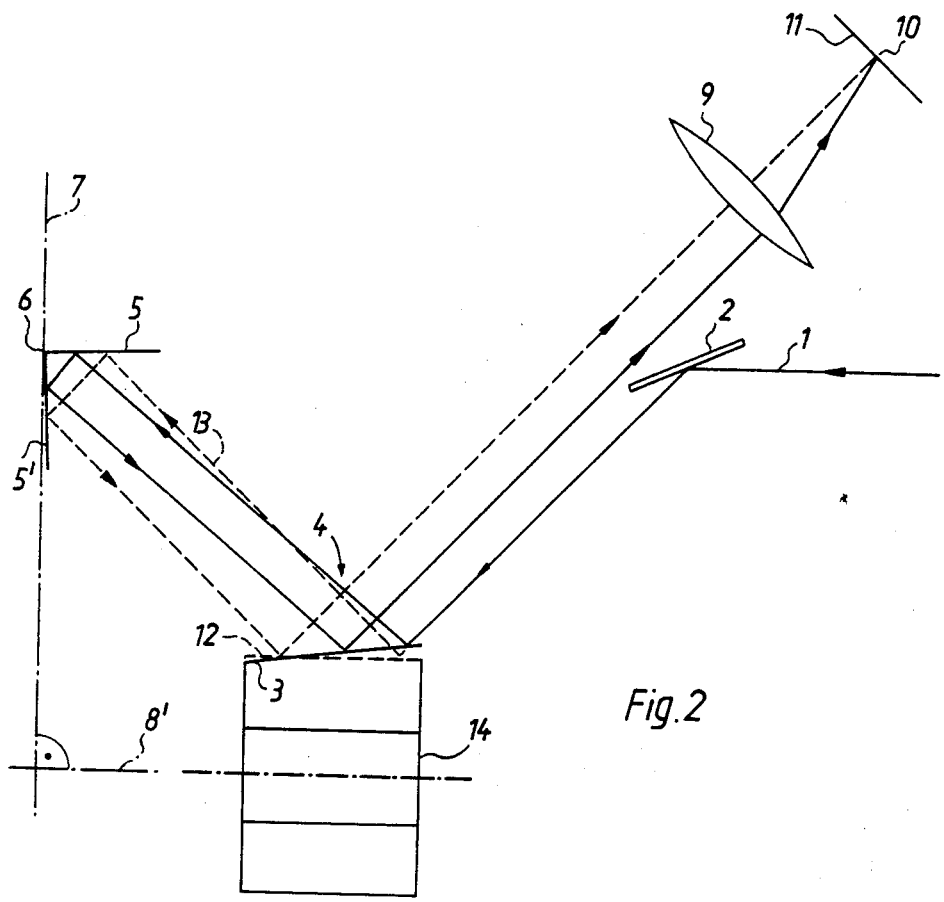
FIG. 2 illustrates a device for correcting the pyramidal error utilizing a right-angled roof-shaped mirror.

FIG. 2 illustrates one particular embodiment of the invention for correcting the pyramidal error. There is shown a mirror wheel 14 rotating on an axis 8'. A lens 9 focusses the light beam coming from the mirror wheel on a plane surface 11.

Consider for a moment the effect of the pyramidal errors on the location of images on the plane surface 11. The vertical displacement $V_p$ on the plane 11 is given by the formula $V_p = 2 \cdot \psi_{p_1} \cdot F$, where $F$ is the focal length of the focussing lens 9, and $\psi_{p_i}$ is the pyramidal error associated with the plane $p_i$ of the mirror wheel.

The change in displacement of the scanning line due to the pyramidal error when the mirror wheel rotates is given by the formula $V_p = 2 \cdot F (\psi_{p_1} - \psi_{p_2})$ where $\psi_{p_1}$ and $\psi_{p_2}$ are the pyramidal errors associated with two neighboring planes $p_1$ and $p_2$ of the mirror wheel.

We can calculate an actual example of this vertical displacement by using particular values for the parameters. Consider a $\Delta\psi_p = 25$ inches, and a lens with a focal length $F = 160$ mm. We convert the angular measure for $\Delta\psi_p$ into radians and apply our formula given above.

$V_p = 2 \cdot F \cdot \Delta\psi_p$
$= 2 \cdot 160 \text{ mm} \cdot 0.121 \cdot 10^{-3}$
$= 38 \mu\text{m}.$ In a system with a scanning line difference of $100 \mu$m this amounts to approximately a 40% deviation.

Reducing the pyramidal error increases the production cost of a mirror wheel considerably. The horizontal or azimuthal deviation can be corrected by a particular mounting of the motor shaft turning the mirror wheel. Such arrangements might involve the use of air suspension bearings.

FIG. 2 illustrates the embodiment of the invention employing a right-angled roof-shaped mirror 5, 5'. The invention serves to overcome the pyramidal error without very costly manufacturing or production techniques.

FIG. 2 shows an incoming light beam 1, reflected by a mirror 2, and thereby directed to the mirror wheel 14. The light beam 1 is reflected by a surface 3 of the mirror wheel and results in a reflected beam 4 indicated by the solid line, which impinges upon the surface 5 of the right-angled mirror 5, 5' and is then reflected by the surface 5 to the surface 5'. The beam is then reflected by the surface 5' to the mirror wheel surface 3 once again. The beam reflected by the surface 3 is targeted at the converging lens 9. The lens 9 focusses the beam at a point 10, corresponding to the focal point of the lens. The point 10 is located on a plane scanning surface 11.

The right-angled mirrors 5 and 5' are shown in cross section in FIG. 2. The mirrors 5 and 5' are plane mirrors which meet in a line 6, shown as a point in FIG. 2. The line 6 lies in a plane 7, which is perpendicular to the axis 8' of the mirror wheel 14.

FIG. 2 also illustrates the path of a light of the beam impinging on an ideal mirror wheel in which the planar surfaces are exactly parallel to the axis 8' as indicated by the dotted line 12. The incoming beam 1 would hit the surface 12 of the mirror wheel and result in a reflected beam 13, represented by the dotted lines, which would then reflect from the surfaces 5, 5', and 12 once again, before being reflected to the lens 9. The beam 13 is seen passing through the lens 9 and converging to the same point 10 on the plane 11 that the beam 4 converges to.

The essential feature of the roof-shaped mirror is shown in FIG. 2: the reflected beam returned to the mirror wheel is parallel to the outgoing beam from the mirror wheel. The convergence of these beams by the lens 9 to a single point 10 effectively eliminates any pyramidal error associated with a surface 3 of the mirror wheel which is not parallel to the axis 8'. The direction of the parallel beams 4 or 13 depends on the angle of incidence of the beam 1 on the mirror wheel.

Figure 3:
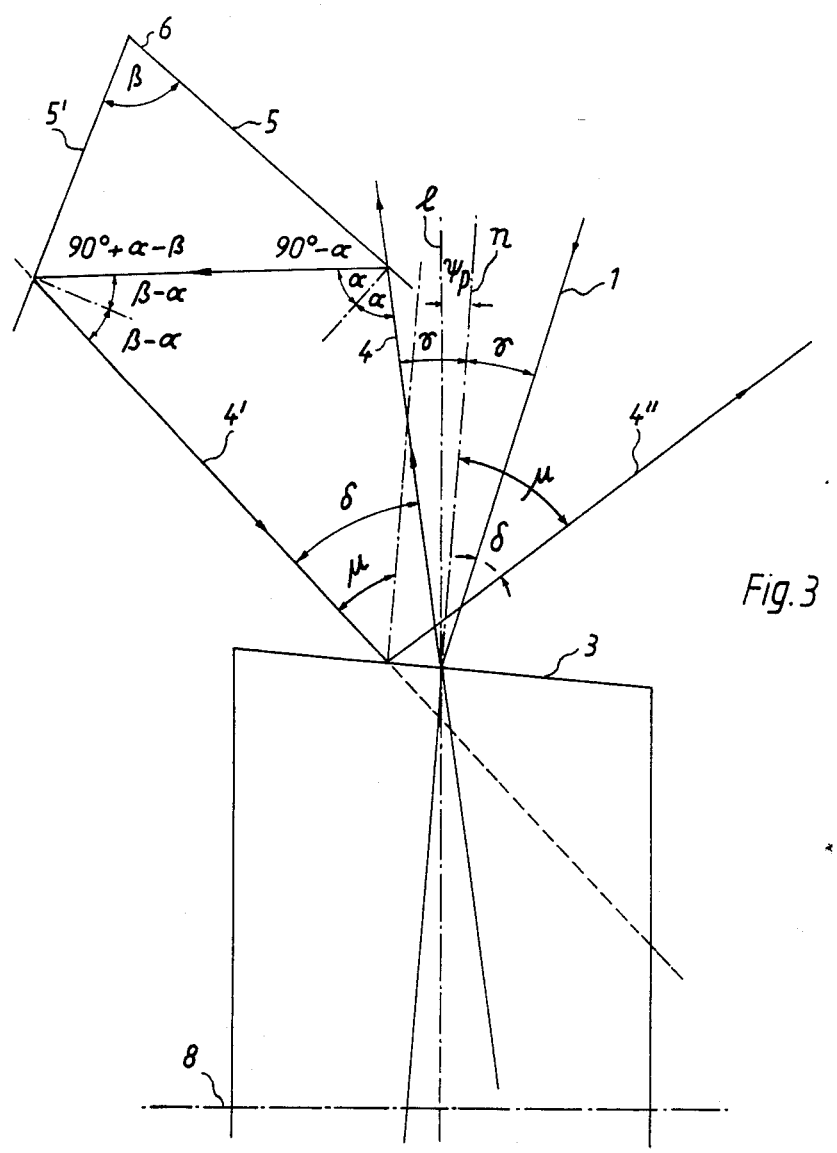
FIG. 3 illustrates the geometric analysis of the rays reflected by the device utilizing an acute-angled roof-shaped mirror.

FIG. 3 indicates that the rock-shaped mirror need not be a right-angled mirror in FIG. 3 the surface of the mirror wheel 3 is shown, as well as the incoming beam 1. The axis of the mirror wheel is represented by the dashed line 8. The roof-shaped mirror is represented in cross section by lines 5 and 5', which meets in a line represented by the point 6, shown in cross section. The angle between planes 5 and 5' is given by angle $\beta$.

The normal to the surface 3 is shown by the dotted line labeled $n$. The radial which is perpendicular to the axis 8 is shown by the dotted line labeled 1. The angle between the line 1 and $n$ is the pyramidal error $\psi_p$. The incoming beam 1 strikes the surface 3 of the mirror wheel with an angle of incidence $\gamma$. The reflected beam 4 from the surface 3 then strikes the mirror surface 5 with an angle of incidence $\alpha$. The beam 4 is then reflected from the surface 5 and strikes the surface 5' with an angle of incidence $\beta - \alpha$. The beam is reflected from the surface 5' resulting in a beam 4' which strikes the mirror wheel surface 3 with an angle of incidence $\mu$. The angle between the outgoing beam 4 and the incoming beam 4' is labeled $\delta$. By a geometric analysis, one can see that the angle between the reflected beam 4'' from the surface 3, and the original incident beam 1 is given by the same angle $\delta$.

The deflection angle of the final beam from the surface of the mirror wheel is double that of a beam reflecting from the usual mirror wheel arrangement. Although the speed of rotation of the mirror wheel may be the same, the width between scanning lines will be doubled within the range of the angle of rotation, and the writing speed will be twice as fast.

The method of correction or compensation of pyramidal error in an optical arrangement comprising a mirror wheel is not meant to be limited to the specific embodiment described above. The roof-shaped mirror may be designed with reflective prisms instead of reflective plane mirror surfaces, for example. The mirror wheel may be a pyramidal-shaped body, rather than a prism-shaped body. Differences in the angle of incidence may also be possible using different axes of rotation for the mirror wheel, with respect to the fixed direction of the incoming beam.

It will be understood that each of the elements described above, or two or more together, may also find a useful application in other types of optical apparatus differing from the types described above.

While the invention has been illustrated and described as embodied in a method and apparatus for correcting pyramidal error in an optical system with a mirror wheel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended:

1. A method for correcting pyramidal errors in an optical system including a mirror wheel having an axis and a plurality of light-reflective planar surfaces disposed about the circumference of said wheel, each of said planar surfaces being only substantially parallel to said axis and thereby producing respective pyramidal errors, comprising the steps of directing a primary beam of light from a light source onto one of said planar surfaces requiring correction of its pyramidal error so as to produce a first reflected beam; receiving said first reflected beam and at least twice reflecting the latter to direct a second reflected light beam back towards said same one planar surface so as to produce a final reflected beam; and focussing respective ones of said final reflected beams from said planar surfaces at a focal point.

2. A compensation device for correcting pyramidal errors in an optical system, comprising a mirror wheel having an axis and a plurality of light reflective planar surfaces disposed about the circumference of said wheel, each of said planar surfaces being only substantially parallel to said axis and thereby producing respective pyramidal errors; a light source directing a primary beam of light onto one of said planar surfaces requiring correction of its pyramidal error as as to produce a first reflected beam; reflecting means for receiving said first reflected beam and for at least twice reflecting the latter to direct a second reflected light beam back towards said same one planar surface so as to produce a final reflected beam; and focussing means for focussing respective ones of said final reflected beams from said planar surfaces at a focal point.

3. A device as defined in claim 2, wherein said first and second reflected light beams form a first angle equal to a second angle formed by said primary and final reflected beams.

4. A device as defined in claim 2, wherein said means for focussing is a converging lens.

5. A device as defined in claim 2, wherein said reflecting means comprises two plane mirrors meeting at an angle.

6. A device as defined in claim 5, wherein said angle is 90°.

7. A device as defined in claim 5, wherein said angle differs from a 90° angle.

8. A device as defined in claim 5, wherein the line formed by the intersection of said two plane mirrors lies in a plane which is perpendicular to said axis of the mirror wheel.

9. A device as defined in claim 2, wherein said means for focussing is a telecentric optical system.

* * * * *